Figure 1:
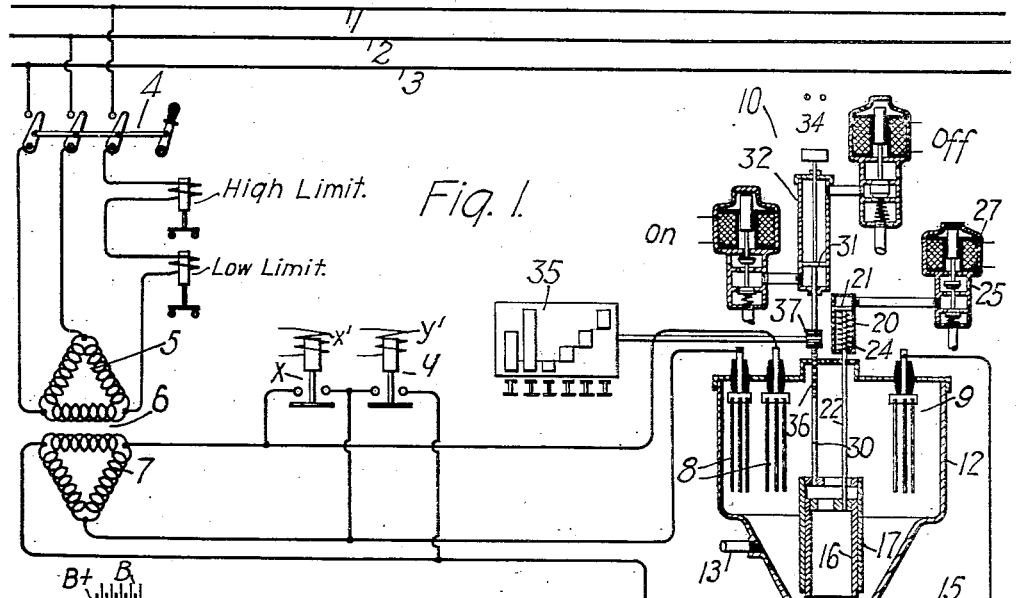

K. A. SIMMON & A. J. HALL.
CONTROL SYSTEM.
APPLICATION FILED JUNE 9, 1914.

1,233,412.

Patented July 17, 1917.

WITNESSES:

INVENTORS
Karl A. Simmon
& Arthur J. Hall
BY
Wesley G. Carr
ATTORNEY

UNITED STATES PATENT OFFICE.

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,233,412.   Specification of Letters Patent.   Patented July 17, 1917.

Application filed June 9, 1914. Serial No. 843,931.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, with special reference to systems that are adapted for multiple-unit operation of electric railway vehicles which are propelled by polyphase induction motors and governed through the agency of liquid rheostats.

One of the objects of our invention is to provide a system of the above-indicated class which shall embody a liquid rheostat that is connected to the secondary winding of a polyphase induction motor, and the action of which is manually controlled during the first portion of the accelerating period, after which, automatic operation and regulation thereof is effected.

In another aspect, an object of our invention is to provide a system of the multiple-unit type which embodies a plurality of driving motors or sets of mechanically associated motors having separate and independent governing liquid rheostats which are initially manually controlled concurrently and which are adapted to be automatically regulated by means of current-limit relays, under predetermined conditions, whereby the respective loads taken by the various motors or mechanically connected sets of motors shall be substantially equal, irrespective of slight differences in mechanical construction, operating conditions and diameters of driving wheels.

In electric locomotives that are provided with a plurality of driving trucks, each having a polyphase induction motor or set of motors which are mechanically associated with the driving wheels, it is often desirable to manually control the operation of the driving motors concurrently by the means of a single master controller and liquid rheostats or other resistance devices which are severally associated with the respective driving motors or sets of driving motors. However, on account of the numerous variables in the apparatus associated with the respective driving trucks, such as differences in mechanical construction of the motors, liquid rheostats, and operating mechanisms, and in differences in diameters of driving wheels, as well as the densities of the electrolytes, and their rates of flow, it is evident that, during the manual control of the locomotive, the loads are not necessarily, and, in fact, are not usually divided evenly between the driving motors or sets of motors.

When the load is light, these differences are relatively unimportant, but, when the motors are loaded to substantially their full capacity, it is desirable to provide means for effecting a substantially equal division of the load, irrespective of the differences which have been enumerated. Moreover, it is advantageous to provide switches for short-circuiting the rheostats when all of the secondary resistances have been eliminated from circuit, and, for best operation, provision should be made for closing the short-circuiting switches only under predetermined circuit conditions.

According to our invention, we propose to overcome the difficulties hereinbefore mentioned, and to make adequate provisions for accomplishing the ends which have been set forth as desirable.

For the sake of simplicity, we have illustrated our invention in connection with a single driving motor and its associated liquid rheostat, although we have illustrated a system of the multiple-unit type which is capable of being associated with other similar systems through the agency of train line conductors, in a manner that is well known to those skilled in the art.

Figure 2:
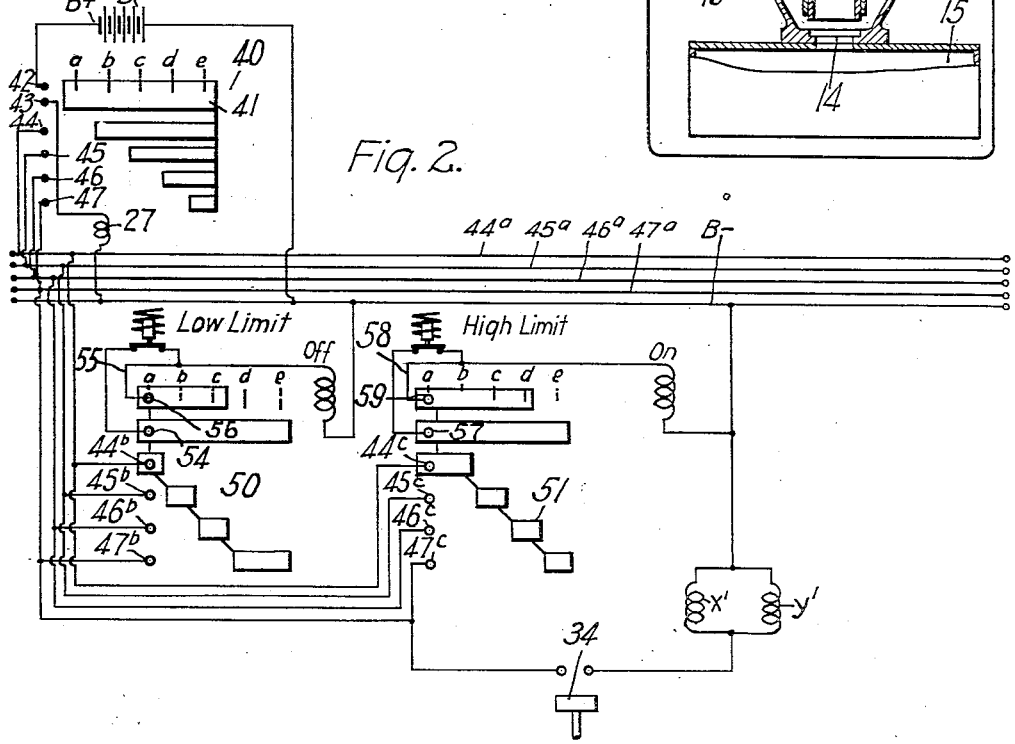

In the accompanying drawing, Figure 1 is a diagrammatic view of the main circuits and apparatus of a system of control embodying our invention, and Fig. 2 is a similar view of the auxiliary control circuits and control devices for governing the operation of the apparatus shown in Fig. 1.

Referring to the drawing, a plurality of supply circuit conductors 1, 2 and 3 deliver alternating current polyphase energy through a suitable line switch 4 to primary windings 5 of a polyphase induction motor 6 having secondary windings 7 which are connected to a plurality of coöperating electrodes 8 of a liquid rheostat 9, the operation of which is effected by means of an electro-pneumatic mechanism 10. A plurality of switches $x$ and $y$ are provided for short-circuiting the secondary windings 7 of the motor 6, and a plurality of current-limit relays marked "High limit" and "Low limit" are employed for the purpose of automatically controlling the operation of the mechanism 10 under predetermined conditions.

The liquid rheostat 9 may be of any well-known construction and preferably embodies a tank 12 having an inlet opening 13 for continuously admitting electrolyte, and a bottom outlet opening 14 for discharging the electrolyte into a main receiving reservoir 15, a plurality of tubular concentric valve members 16 and 17 which are relatively movable, the valve 16 being adapted to close the outlet or the discharge opening 14 and the valve 17 being adapted to regulate the height of the electrolyte within the tank 12.

The operating mechanism 10 comprises a cylinder 20 having a movable piston 21 which is mechanically associated through a rod 22 with the discharge valve 16, said valve 16 being normally maintained in its upper position by a spring 24. An electrically operated valve 25 controls the admission and release of a suitable operating fluid, such as compressed air, to and from the operating cylinder 20. Said valve 25 is so constructed that, under normal conditions, with its energizing coil 27 inactive, the supply of operating fluid is cut off, and the cylinder 20 is open to the atmosphere.

The regulating valve 17 is connected, by means of a rod 30, to a piston 31 that is movable within an operating cylinder 32 which is provided with a plurality of electrically controlled valves marked "Off" and "On," the "off" valve controlling the admission of operating fluid to the upper end of the cylinder 32 and the "on" valve performing a similar function with respect to the lower end of said cylinder. The "off" valve, when deënergized, admits operating fluid to the cylinder 32 and thus normally tends to maintain the piston 31 in its lowest position, while the "on" valve when deënergized effects communication between the lower end of the cylinder 32 and the atmosphere. Obviously, when both the "off" and the "on" valves are energized, operating fluid is admitted beneath the piston 31 and released above it, whereby unbalanced pressure conditions obtain which move the piston 31 and its associated regulating valve 17 in an upward direction until the "off" valve is deënergized, when balanced pressure conditions result, and the piston 31 and regulating valve 17 are brought to rest.

An auxiliary control drum 35 is mechanically associated with the rod 30 by means of rack 36 and pinion 37, whereby said drum is positively rotated in the one or the other direction, in accordance with the operation of the regulating valve 17.

Reference may now be had particularly to Fig. 2, in which is shown a master controller 40 comprising a movable conducting segment 41 and a plurality of stationary contact terminals 42 to 47, inclusive, which are adapted for coöperative engagement therewith upon the position-indicating lines $a$, $b$, $c$, $d$ and $e$. The stationary contact terminals 44 to 47, inclusive, of the master controller 40 are connected, respectively, to a plurality of train line conductors $44^a$, $45^a$, $46^a$ and $47^a$, which are respectively connected to a plurality of stationary contact terminals $44^b$, $45^b$, $46^b$, $47^b$, $44^c$, $45^c$, $46^c$, and $47^c$ of the auxiliary controller 35 embodying a plurality of movable conducting segments 50 and 51 which are adapted to coöperatively engage the contact terminals $44^b$ to $47^b$ and $44^c$ to $47^c$ along the position-indicating lines $a$, $b$, $c$, $d$ and $e$. Stationary contact terminal 42 of the master controller 40 is connected to one terminal B+ of a battery B, or other suitable source of energy, while the terminal 43 is connected to a train line conductor B— through the energizing coil 27 of the valve 25.

The "low limit" relay is adapted to be connected in circuit with the energizing coil of the "off" valve, and the "high limit" relay to be effective in controlling the energy of the coil of the "on" valve when the movable conducting segments 50 and 51 are moved into their positions $d$ and $e$, respectively. The "low limit" relay is connected between the "off" valve coil and a contact terminal 54 and is normally short-circuited by a conductor 55 connected to a contact terminal 56, while the "high limit" relay is connected between the "on" valve coil and a contact terminal 57 and is normally short-circuited by conductor 58 having a connection to contact terminal 59.

Energizing coils $x'$ and $y'$ of the short-circuiting switches $x$ and $y$ are connected between the B— train line conductor and contact terminal $47^c$, provided the auxiliary interlock switch 34 is closed.

Assuming the arrangement of apparatus and circuit connections to be as shown, the operation of the system is as follows: The master controller 40 is first moved into its position $a$, thereby completing a circuit from one side of the battery B, which includes stationary contact terminals 42 and 43, that are bridged by the conducting segment 41, and, thence, through energizing coil 27 of the valve 25 to the train line conductor B—. The valve 25 is thereby opened to admit fluid pressure above the piston 21, whereby the discharge valve 16 is forced downwardly and closed. The electrolyte which is continuously flowing through the inlet opening 13 into the rheostat tank 12, therefore, rises in the rheostat to a height corresponding to the upper end of the regulating valve 17, at which height the lower ends of the electrodes 8 are immersed. A circuit is thus completed through the secondary windings 7 of the motor 6, and said motor is started into operation at slow speed.

If the master controller 40 be moved into position $b$, terminal 44, train line conductor 44$^a$, and auxiliary controller stationary terminals 44$^b$ and 44$^c$ are energized, and a circuit is completed from contact terminal 44$^b$ through conducting segment 50, contact terminal 56, conductor 55 and the "off" energizing coil to the B— train line conductor, while another circuit is established from contact terminal 44$^c$ which includes conducting segment 51, contact terminal 59, conductor 58 and the "on" energizing coil to the train line conductor B—. Thus, the energizing coils of the "off" and "on" valves are energized, and said valves are accordingly actuated, whereby operating fluid is admitted through the "on" valve beneath the piston 31 and is released through the "off" valve from above said piston.

Under these unbalanced pressure conditions, the piston 31 and regulating valve 17 are moved upwardly until the auxiliary control drum 35 occupies its position $b$, in which the contact terminal 44$^b$ becomes disengaged from the conducting segment 50 and the "off" valve is deënergized and caused to admit operating fluid above the piston 31. Balanced pressure conditions are thus obtained and further movement of the regulating valve 17 is prevented. The continuously flowing electrolyte, therefore, rises in the rheostat tank 12 to a level corresponding to the new position of the regulating valve 17, the excess thereof overflowing into the reservoir 15. The motor secondary resistance is thus reduced and the speed increased.

To further increase the speed of the motor 6, the master controller 40 is moved to position $c$ in which the contact terminal 45, train line conductor 45$^a$ and contact terminals 45$^b$ and 45$^c$ are energized, and a circuit is completed from contact terminal 45$^b$ through conducting segment 50 and contact terminal 56 and thence through the "off" energizing coil, as hereinbefore described. Thus, the "off" valve is actuated to cut off the supply of operating fluid and to establish a communication from the upper end of the cylinder 32 to the atmosphere. As the operating fluid pressure is reduced above the piston 31, said piston is again moved upwardly until the control drum 35 has reached its position $c$ in which contact terminal 45$^b$ is disengaged from the conducting segment 50 and hence deënergizes the "off" valve coil. The "off" valve then returns to its normal position to again admit operating fluid above the piston 31 and to arrest further movement. Thus, it is seen that the regulating valve 17 is raised to another definite position, and a new level of electrolyte is established within the rheostat tank 12. It is, of course, possible to have any desired number of steps similar to those just described by suitably designing the auxiliary control drum 35 and master controller 40.

Let it be assumed now that the motor load is relatively large and that the level of the electrolyte within the rheostat has been raised to within a comparatively short distance of its maximum level. A further increase of speed of the motor 6 may be effected by moving the master controller 40 to position $d$, in which contact terminal 46, train line conductor 46$^a$ and contact terminals 46$^b$ and 46$^c$ are energized, and a circuit is established from contact terminal 46$^b$ through conducting segment 50 and the energizing coil of the "off" valve, in the manner already described. As the "off" valve is energized and caused to release the operating fluid from above the piston 31, said piston and associated regulating valve 17 are raised. However, as the control drum 35 is moved out of position $c$, the contact terminal 56 becomes disengaged from the conducting segment 50 which causes the energizing current to traverse contact terminal 54 and thence, through the coöperating switch members of the "low limit" relay and the "off" energizing coil, to the train conductor B—. As soon as this action takes place, further operation of the rheostat is rendered automatic and dependent upon the action of the "low limit" relay which is traversed by the primary motor current.

If the motor current is less than the value for which the "low limit" relay is set, the operation continues as before and the regulating valve is raised to its maximum position. However, if the motor current is greater than said value, the coöperating switch members of the "low limit" relay are disengaged and the "off" valve coil is deënergized, whereby further upward movement of the regulating valve 17 is prevented until the motor current has been reduced sufficiently to permit the "low limit" relay to again assume its normal position, in which the "off" valve coil is again energized and the upward movement of the valve 17 is resumed. The operation, therefore, is entirely automatic and independent of the master controller, provided, of course, that said controller is placed in position $d$ or $e$.

When the regulating valve 17 has been raised sufficiently to move the controller drum 35 beyond its position $d$, the contact terminal 59 becomes disengaged from the conducting segment 51 and a circuit is completed from contact terminal 57 which includes the coöperating switch members of the "high limit" relay and the "on" energizing coil. The "high limit" relay is thus brought into action and becomes effective in deënergizing the "on" valve coil, provided the current in the motor is greater than an excessively high value for which said device is adjusted.

Under these conditions, both the "low limit" relay and the "high limit" relay are raised to deënergize the "off" and the "on" valve coils. Thus, pressure is admitted above the piston 31 and released from beneath it, and the piston and the regulating valve 17 are moved downwardly to lower the electrolyte level, and consequently, increase the resistance of the secondary motor windings. This downward movement continues until sufficient resistance has been inserted to reduce the motor current to a value which permits the "high limit" relay to resume its normal position and to again energize the "on" valve coil, whereby the "on" valve is actuated to admit operating fluid beneath the piston 31 and prevent further movement thereof.

When the current is decreased sufficiently to permit the "low limit" relay to fall, the "off" valve is again actuated to release pressure above the piston, and the upward movement of the regulating valve is resumed until it occupies its uppermost position, in which the auxiliary interlock switch 34 completes a circuit from contact terminal 47ᶜ which includes the energizing coils $x'$ and $y'$ of the short-circuiting switches $x$ and $y$. Upon the completion of this circuit, said short-circuiting switches $x$ and $y$ are closed and all of the motor secondary resistance is excluded from circuit, in which case, full operating speed is attained.

From the foregoing description, it will be understood that the motor 6 is manually controlled through the liquid rheostat 9 during the first portion of the accelerating period, while automatic operation and regulation thereof is effected during the last portion thereof just prior to the closure of the short-circuiting switches, which switches can only be closed when the motor current is maintained within predetermined limits.

The system, as set forth, is adapted for multiple-unit operation, and if employed upon a locomotive or other electrically controlled vehicle, such as is hereinbefore referred to, it is clear that the load will be equally divided between the several independent driving units or sets of units, under substantially full-load conditions, irrespective of any mechanical or electrical differences in the driving units, associated operating mechanisms or driving wheels.

Our invention is not, of course, restricted to the specific arrangement and location of parts and circuit connections shown, or, in its broadest aspects, to any particular type of control devices, and we, therefore, desire that only such limitations shall be imposed as are indicated in the appended claims.

We claim as our invention:

1. In a control system, the combination with an electric motor, an accelerating resistance therefor, means for adjusting said resistance, and means embodying a controller for manually controlling the action of said resistance-adjusting means, of means for rendering said manually controlled means dependent upon circuit conditions when said controller occupies a predetermined position.

2. In a control system, the combination with an electric motor, an accelerating resistance therefor, means for adjusting said resistance, and means for manually controlling the action of said resistance-adjusting means, of electro-responsive means for controlling the action of said resistance-adjusting means, and means for bringing said electro-responsive means into action under predetermined conditions.

3. In a control system, the combination with an electric motor, an accelerating resistance therefor, means for adjusting said resistance, and means for manually controlling the action of said resistance-adjusting means, of a current-limit relay dependent upon the current traversing said motor for automatically controlling the action of said resistance-adjusting means, said limit relay being initially inactive, and means associated with said manual controlling means for rendering said limit relay effective when said controlling means occupies a predetermined position.

4. In a control system, the combination with an electric motor, an accelerating resistance therefor, means for adjusting said resistance, and means for manually controlling the action of said resistance-adjusting means, of a plurality of initially inactive electro-responsive devices adapted to be rendered active under predetermined conditions for automatically controlling the action of said resistance-adjusting means.

5. In a control system, the combination with an electric motor, and power-actuated apparatus for governing the acceleration thereof, of means for manually controlling said power-actuated apparatus during the first portion of the accelerating period and for automatically controlling said apparatus during the latter portion thereof in accordance with circuit conditions.

6. In a control system, the combination with an electric motor, power-operated apparatus for governing the acceleration thereof, a control drum mechanically associated with said apparatus and actuated thereby, and a master controller electrically connected to said apparatus through said control drum for manually controlling the operation of said apparatus during a portion of its operation, of electro-responsive means associated with said control drum for automatically controlling said apparatus during another portion of its operation in accordance with circuit conditions.

7. In a control system, the combination with an electric motor, a power-operated apparatus for governing the acceleration thereof, a master controller for controlling the operation of said power-actuated apparatus, and an auxiliary control drum adapted to be actuated by said apparatus and to coöperate with said master controller for causing said apparatus to move into a series of definite predetermined positions corresponding to positions of the master controller, of means rendered operative by said control drum in a predetermined position for automatically regulating the action of said apparatus in accordance with circuit conditions.

8. In a control system, the combination with an electric motor, a liquid rheostat for governing the acceleration thereof, and an electrically controlled actuating mechanism for said rheostat, of manually operated means for causing said mechanism to move to any of a plurality of definite positions, and automatic means adapted to be operatively associated with said manually operated means in a predetermined position of said mechanism for regulating the action of said mechanism in accordance with circuit conditions.

9. In a control system, the combination with an electric motor, a liquid rheostat for governing the acceleration thereof and having a movable member adapted to fix the height of electrolyte therein, a power-operated device for actuating said movable member, and manually-controlled means for governing the operation of said actuating device, of means for rendering the control of said power device automatic in accordance with circuit conditions when said movable member reaches a predetermined height.

10. In a control system, the combination with an electric motor, a liquid rheostat for governing the acceleration thereof and having a movable member adapted to fix the height of electrolyte therein, a power-operated device for actuating said movable member, and manually controlled means for governing the operation of said actuating device, of electro-responsive means for automatically governing the operation of said actuating device under predetermined circuit conditions and means for rendering said electro-responsive means effective at a predetermined height of said movable member.

11. In a control system, the combination with an electric motor, a liquid rheostat for governing the acceleration thereof and having a movable member adapted to fix the height of electrolyte therein, an electro-pneumatic operating mechanism for actuating said movable member, an auxiliary control drum operated by said mechanism, and a manually-operated master controller coöperating therewith for governing the operation of said operating mechanism and causing the electrolyte to be fixed at any of a plurality of predetermined heights, of automatic means adapted to be rendered active under predetermined circuit conditions when the electrolyte level is at a predetermined height for regulating the action of said mechanism, and means for short-circuiting said motor when said mechanism occupies its highest position.

12. In a system of multiple-unit control for electric motors, the combination with a plurality of motors, and a liquid rheostat for each motor for independently governing its acceleration, of manually-controlled means for concurrently governing the operation of the several rheostats during the first portion of the accelerating period, and means for independently and automatically controlling the several rheostats in accordance with circuit conditions during the latter portion of the accelerating period.

13. In a control system, the combination with electrical apparatus, regulating means for governing the operation of said apparatus, and means embodying a control device for manually controlling the operation of said regulating means, of means for rendering said manually controlled means automatic in accordance with circuit conditions when said control device occupies a predetermined position.

14. In a control system, the combination with electrical apparatus, regulating means for governing the operation of said apparatus, and means for manually controlling the action of said regulating means, of electro-responsive means for controlling the action of said regulating means, and means for bringing said electro-responsive means into action under predetermined conditions.

15. In a control system, the combination with electrical apparatus, regulating means for governing the operation of said apparatus, and means for manually controlling the action of said regulating means, of means for rendering said manually controlled means automatic in accordance with circuit conditions when said regulating means occupies a predetermined position.

16. In a control system, the combination with electrical apparatus, regulating means for governing the operation of said apparatus, and means for manually controlling the action of said regulating means, of an initially inactive relay for automatically controlling the action of said regulating means in accordance with circuit conditions, and means associated with said manual controlling means for rendering said relay effective when said controlling means occupies a predetermined position.

17. In a control system, the combination with electrical apparatus, regulating means for governing the operation of said apparatus, and means for manually controlling the action of said regulating means, of a plurality of initially inactive electro-responsive devices adapted to be rendered active under predetermined conditions for automatically controlling the action of said regulating means.

18. In a control system, the combination with electrical apparatus, and regulating means for governing the operation of said apparatus, of means for manually controlling said regulating means during the first portion of the governing period and for automatically controlling said regulating means during the latter portion thereof in accordance with circuit conditions.

19. In a control system, the combination with electrical apparatus, regulating means for governing the operation of said apparatus, and means for manually controlling the action of said regulating means during the first portion of the governing period, of a plurality of current relays for automatically controlling the action of said regulating means during the latter portion of said period in accordance with circuit conditions.

20. In a control system, the combination with electrical apparatus, regulating means for governing the operation of said apparatus, switching means associated with said regulating means and actuated thereby, and a controlling device electrically connected to said regulating means through said switching means for manually controlling the operation of said switching means during a portion of its operation, of electro-responsive means associated with said switching means for automatically controlling said regulating means during another portion of its operation and in accordance with circuit conditions.

21. In a control system, the combination with electrical apparatus, regulating means for governing the operation of said apparatus, a master controller for controlling the operation of said regulating means and an auxiliary control drum adapted to be actuated by said regulating means and to coöperate with said master controller for causing said regulating means to move in a series of definite predetermined positions corresponding to positions of said master controller, of means rendered operative by said control drum in a predetermined position thereof for automatically governing the action of said regulating means in accordance with circuit conditions.

22. In a control system, the combination with electrical apparatus, regulating means for governing the operation of said apparatus, and an electrically controlled actuating device for said regulating means, of manually operated means for causing said device to move to any of a plurality of definite positions, and automatic means adapted to be operatively associated with said manually operated means in a predetermined position of said device for governing the action of said device in accordance with circuit conditions.

23. The combination with a movable member, a power operated device for actuating said member, and manually controlled means for governing the operation of said actuating device, of means for rendering the control of said power device automatic in accordance with circuit conditions when said movable member occupies a predetermined position.

24. The combination with a liquid-containing tank, a movable valve disposed therein and adapted to fix the height of the liquid, a power operated device for actuating said valve and manually controlled means for governing the operation of said actuating device, of means for rendering the control of said power device automatic in accordance with circuit conditions when said valve reaches a predetermined height.

25. The combination with a movable member, a power operated device for actuating said movable member, and manually controlled means for governing the operation of said actuating device, of electro-responsive means for automatically governing the operation of said actuating device under predetermined circuit conditions and means for rendering said electro-responsive means effective when the movable member occupies a predetermined position.

26. The combination with a liquid-containing tank, a movable valve associated therewith and adapted to fix the height of the liquid therein, a pneumatically operated mechanism for actuating said valve, an auxiliary control drum operated by said mechanism, and a manually operated master switch coöperating therewith for governing the operation of said operating mechanism and causing the liquid to be fixed at any of a plurality of predetermined heights, of automatic means adapted to be rendered active under predetermined circuit conditions when the liquid is at a predetermined height for regulating the action of said mechanism.

27. In a system of multiple-unit control for electric motors, the combination with a plurality of motors, and regulating means for each motor for independently governing its acceleration, of manually controlled means for concurrently governing the operation of said regulating means during the first portion of the accelerating period, and means for independently and automatically controlling the several regulating means in accordance with circuit conditions during the latter portion of the accelerating period.

In testimony whereof, we have hereunto subscribed our names this 23rd day of May, 1914.

KARL A. SIMMON.
ARTHUR J. HALL.

Witnesses:
H. T. MORRIS,
B. B. HINES.